United States Patent
Hullahalli

(10) Patent No.: US 11,989,333 B2
(45) Date of Patent: May 21, 2024

(54) METHOD AND APPARATUS FOR MANAGING IDENTIFICATION OF A VIRTUAL MACHINE AND A HOST WITHIN A VIRTUAL DOMAIN

(71) Applicant: AT&T Intellectual Property I, L.P., Atlanta, GA (US)

(72) Inventor: Srinandan Hullahalli, Frisco, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 341 days.

(21) Appl. No.: 17/395,066

(22) Filed: Aug. 5, 2021

(65) Prior Publication Data

US 2023/0048343 A1  Feb. 16, 2023

(51) Int. Cl.
*G06F 21/73* (2013.01)
*G06F 9/455* (2018.01)
*G06F 21/57* (2013.01)
*G06F 21/62* (2013.01)
*G06F 21/64* (2013.01)

(52) U.S. Cl.
CPC .......... *G06F 21/73* (2013.01); *G06F 9/45558* (2013.01); *G06F 21/572* (2013.01); *G06F 21/6281* (2013.01); *G06F 21/64* (2013.01); *G06F 2009/4557* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 2006/0129788 A1 | 6/2006 | Maeda et al. | |
| 2010/0205304 A1 | 8/2010 | Chaturvedi et al. | |
| 2015/0200808 A1* | 7/2015 | Gourlay | H04L 63/0876 709/225 |
| 2015/0324216 A1* | 11/2015 | Sizemore | G06F 9/45558 718/1 |
| 2017/0155620 A1 | 6/2017 | Bar David | |
| 2017/0264684 A1 | 9/2017 | Spillane et al. | |
| 2017/0339018 A1 | 11/2017 | Prabhu et al. | |
| 2020/0034462 A1 | 1/2020 | Narayanasamy et al. | |
| 2020/0042402 A1 | 2/2020 | Padia et al. | |
| 2020/0065127 A1 | 2/2020 | Kim et al. | |
| 2020/0084195 A1* | 3/2020 | Levy | H04L 63/0823 |
| 2020/0204450 A1 | 6/2020 | Li et al. | |
| 2020/0285686 A1* | 9/2020 | Murray | G06F 21/31 |
| 2021/0211305 A1 | 7/2021 | Gill et al. | |
| 2021/0303530 A1* | 9/2021 | Dai | G06F 16/188 |
| 2022/0100862 A1* | 3/2022 | Vetter | G06F 21/604 |

* cited by examiner

*Primary Examiner* — Sanchit K Sarker
(74) *Attorney, Agent, or Firm* — Guntin & Gust, PLC; Andrew Gust

(57) ABSTRACT

Aspects of the subject disclosure may include, for example, identifying a request to install a guest virtual machine on a physical host; identifying a UUID of the physical host; generating a virtual machine reference value; defining a modified UUID of the guest virtual machine comprising the UUID of the physical host and the virtual machine reference value; and assigning the modified UUID to the guest virtual machine, the physical host being identifiable via the modified UUID of the guest virtual machine. Other embodiments are disclosed.

20 Claims, 8 Drawing Sheets

METHOD AND APPARATUS FOR MANAGING IDENTIFICATION OF A VIRTUAL MACHINE AND A HOST WITHIN A VIRTUAL DOMAIN

FIELD OF THE DISCLOSURE

The subject disclosure relates to correlation of a virtual machine to a host within a virtual domain.

BACKGROUND

Virtualization represents one approach for optimizing available hardware resources. Accordingly, virtualization may be used by service providers to deploy network and/or computer equipment in data centers and/or central offices. Such approaches are widely used across various industries to save on costs and to facilitate an efficient management of resources. Management of virtual machines includes one or more of increasing, deleting, and/or updating virtual resources. A virtual monitor, sometimes referred to as a hypervisor, is a tool that may be used to achieve the above functionality. The hypervisor may act as an intermediary between a physical system, the so-called host, and a virtualized system, the so-called guest.

One example of a hypervisor is a Kernel-based Virtual Machine (KVM). The KVM is an open-source virtualization technology built into the Linux® operating system that provides hypervisor functionality. The KVM supports one or more virtual machines (VMs) of one or more various operating systems alone or in combination with their own specific applications on a single physical hardware platform. Example operating systems include the Linux® operating system, other variants such as Red Hat® operating system, Ubuntu® and/or Windows® operating systems. By design, virtual machines may be isolated from each other to appear as independent servers to an end user and/or client applications.

Each virtual machine may include an associated identifier, e.g., a universal unique identifier (UUID). The UUID may be generated when the virtual machine is initially powered on. The UUIDs of virtual machines may be used for system management in the same manner that a UUID of a physical computer may be used for system management. The UUID may be stored in a system management basic input-output system (SMBIOS) system information descriptor, which may be accessed by probing the hardware, e.g., using an SMBIOS scanning software.

BRIEF DESCRIPTION OF THE DRAWINGS

Reference will now be made to the accompanying drawings, which are not necessarily drawn to scale, and wherein.

DETAILED DESCRIPTION

Figure 1:
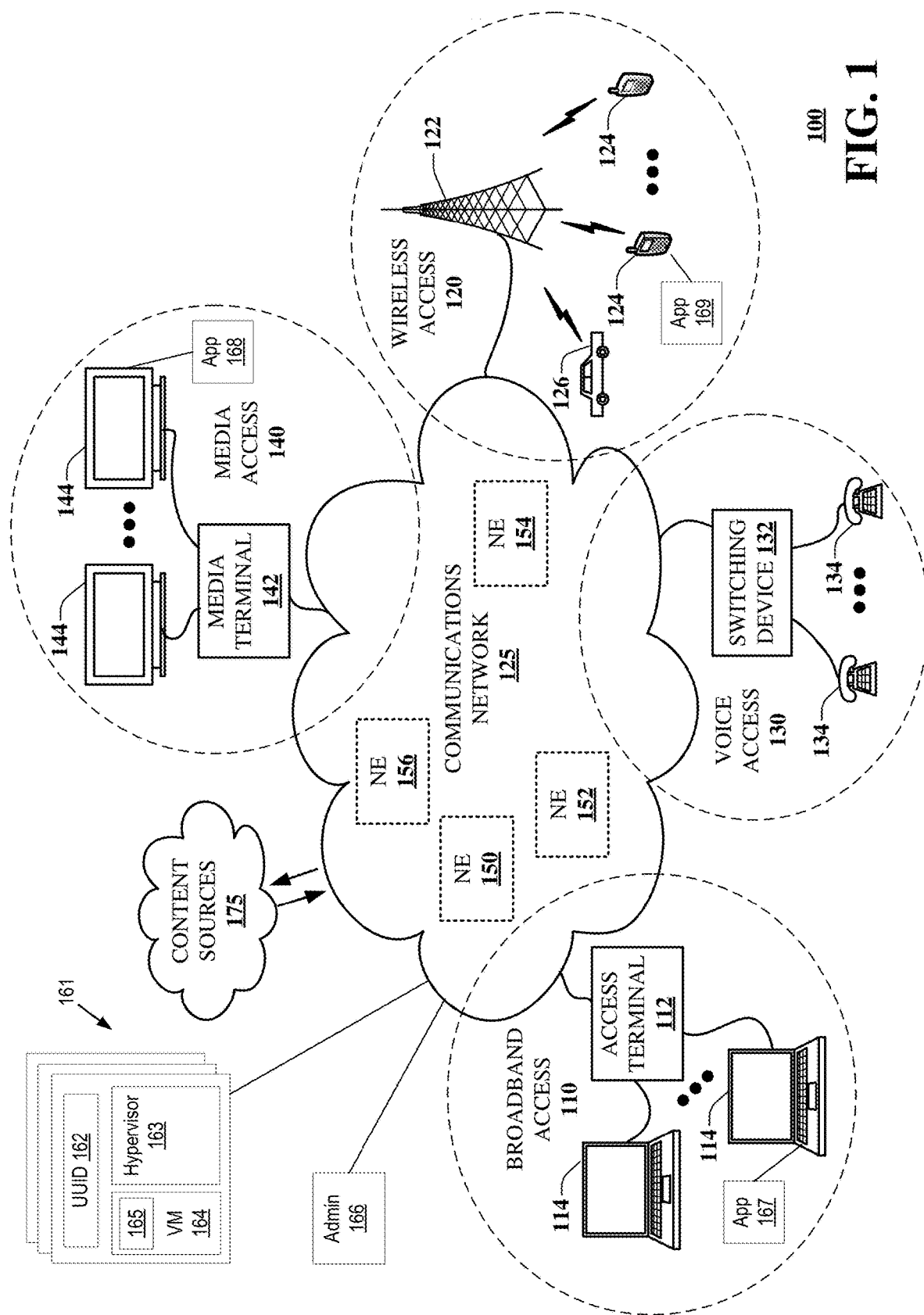
FIG. 1 is a block diagram illustrating an exemplary, non-limiting embodiment of a communications network in accordance with various aspects described herein.

The subject disclosure describes, among other things, illustrative embodiments for tracking guest virtual machines to their respective hosting processors. For example, a private UUID may be generated and assigned to a virtual machine at a time of its creation, wherein the private UUID is based on a UUID of its host processor. Accordingly, an identity of the host processor may be obtained by inspection of the private UUID of the virtual machine and without a need for any reference to an external record of virtual-machine-to-host association. Such management of virtual resources facilitates management of resources, e.g., by locating virtual machines within physical resources of a complex architecture of a data center. Other embodiments are described in the subject disclosure.

One or more aspects of the subject disclosure include a process that includes detecting, by a processing system including a processor, a request to add a virtual machine to a first physical host processing system. According to the process, a first prescribed UUID of the first physical host processing system is discovered by the processing system. A virtual machine reference value is generated by the processing system. A first modified UUID of the virtual machine is also generated by the processing system. The first modified UUID includes the first prescribed UUID of the first physical host processing system and the virtual machine reference value. Further according to the process, the first modified UUID to the virtual machine is assigned by the processing system, whereby the first physical host processing system is identifiable via the first modified UUID of the virtual machine.

One or more aspects of the subject disclosure include a device that includes a processing system including a processor and a memory that stores executable instructions. The instructions, when executed by the processing system, facilitate performance of operations that include determining a request to instantiate a virtual machine on a physical processing system and obtaining a prescribed UUID of the physical processing system. A virtual machine reference value is generated and a modified UUID of the virtual machine is generated. The modified UUID includes the prescribed UUID of the physical processing system and the virtual machine reference value. The modified UUID is assigned to the virtual machine, such that the physical processing system may be identified via the modified UUID of the virtual machine.

One or more aspects of the subject disclosure include a non-transitory, machine-readable medium that includes executable instructions. The instructions, when executed by a processing system including a processor, facilitate performance of operations that include identifying a request to install a guest virtual machine on a physical host and identifying a UUID of the physical host. A virtual machine reference value is identified and a modified UUID of the guest virtual machine is defined that includes the UUID of the physical host and the virtual machine reference value.

The modified UUID is assigned to the guest virtual machine, which renders the physical host identifiable via the modified UUID of the guest virtual machine.

A KVM (Kernel-based Virtual Machine) is a virtualization module provided in the Linux® kernel that allows the kernel, a portion of the operating system code always resident in memory that facilitates interactions between hardware and software components, to function as a hypervisor. The KVM provides tools to create, or "spin-up," virtual machines, including automatic generation of a UUID. Applications using the virtual machines may access the virtual machines, but they do not necessarily reveal where the virtual machine is running, i.e., upon which host processing system.

Heretofore, the underlying virtual machine would have no idea on which host it would be running on nor would it have access to its parent hypervisor. Unless the host identity information is known in advance, it would not be possible to determine which host a specific virtual machine may be running on. Others have used separately generated and maintained mapping tables to identify such associations. For example, a spreadsheet, a database, and/or some other custom tool may be employed to keep track of virtual machines and their associated host processing systems. Unfortunately, such tables may be very large and require constant tracking and updating. Such processes would be cumbersome as the number of virtual machines and/or hosting processors may be very large, e.g., numbering in the hundreds and/or thousands, or more.

One common method used to address this problem includes the use of virsh linux host utility, and/or opensource and commercial tools such as virt-manager, and/or some form of KVM manager, to retrieve information from a stored database/excel document. Customized scripts may be provided to scan physical hosts and their virtual machines to gather the needed info from a hypervisor host. Identifying a virtual machine from a hypervisor host may be relatively straightforward; however, the opposite may prove exceedingly difficult if not impossible.

At least one approach uses a modified UUID for virtual machines that includes a fixed part, e.g., obtained from a parent UUID of the physical host, and a definable and/or variable part, as may be determined for the particular virtual machine. In at least some embodiments, a hypervisor may refer an external file, e.g., a template, to spin up a virtual machine. The hypervisor may be adapted to dynamically generate modified UUIDs when generating virtual machines according to an external file/template. Use of the modified UUIDs including a reference to the host/parent, eliminates any need for retaining and/or relying on separately generated mappings. In order to determine physical host identity, simply examine the modified UUID of the virtual machine, parse out the fixed part and use that to identify the physical host. A record or table of the modified UUIDs of the VMs may be generated and/or otherwise maintained, which alone sufficiently identifies the virtual machine-to-physical host mappings by design.

Accordingly, a modified UUID of a virtual machine suitably configured in this manner, may be used to immediately identify a host processor and/or parent hypervisor, without any need to reference an external association mapping, spreadsheet and/or database or other separately stored record of the pairing. That said, a record, e.g., a listing, of host processor and/or parent hypervisor UUIDs may be used, e.g., referenced, to facilitate interpretation of the modified UUID. Such a virtual machine pairing table based on modified UUID may be generated according to a relatively simple method, e.g., by collect modified UUIDs and a listing of the virtual machines, and generating a data record, table and/or database record of host and/or parent hypervisor to virtual machine pairings based on the modified UUIDs.

Referring now to FIG. 1, a block diagram is shown illustrating an example, non-limiting embodiment of a system 100 in accordance with various aspects described herein. For example, system 100 can facilitate in whole or in part the identifying of a request to install a guest virtual machine on a physical host, the identifying of a UUID of the physical host, the identifying of a virtual machine reference value, and the defining of a modified UUID of the guest virtual machine. The modified UUID includes the UUID of the physical host and the virtual machine reference value and may be assigned to the guest virtual machine, allowing for identification of the physical host via the modified UUID of the guest virtual machine. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

The example system includes one or more physical host processing systems, referred to herein as host processors or simply hosts 161. The hosts 161 may include servers, e.g., at one or more datacenters, desktop computers, laptop computers, and the like. The hosts 161 are adapted to run one or more virtual machines 164, sometimes referred to as guest machines. At least some of the hosts 161 include a virtual machine monitor, sometimes referred to as a virtualizer or hypervisor 163. The hypervisor 163 includes computer software, firmware and/or hardware that creates and runs the virtual machines 164. The hypervisor 163 may configure a guest virtual machine 164 with a virtual operating platform including a guest operating system. The hypervisor 163 may manage the execution of the guest operating systems, in at least some instances, providing a variety of different operating systems that share common virtualized hardware resources. Operating systems may include, without limitation, Linux® operating systems, Windows® operating systems, and macOS® operating systems and the like.

Computer hardware, such as the hosts 161, virtual hardware, such as the virtual machines 164 and/or information may be associated with an identifier to facilitate organization of computing and/or communication systems and/or the management of information upon such systems. At least one widely adopted identifier is referred to as a universally unique identifier (UUID). The example hosts 161 include respective UUIDs 162. The UUIDs 162 may include 128-bit, 36-character strings, typically presented with four hyphens as standardized by the ISO, IETF and the ITU. At least a portion of the UUID may include a unique host identifier. Other components of the UUID 162 may include, without limitation, a timestamp, an address family identifier, and so on. According to the illustrative example, the UUIDs 162 are stored in nonvolatile memory, e.g., within the BIOS, of their respective hosts 161.

The virtual machines, acting as independently manageable compute environments, may also be configured with identifiers. In at least some embodiments, the virtual machine identifiers may confirm to the same standards as used in the hosts 161. The example virtual machines 164 are configured with respective UUIDs, sometimes referred to as private UUIDs 165. The private UUIDs 165 may be stored within a BIOS portion of the virtualized environment.

In at least some embodiments, the system 100 includes an administrative function 166 that may be adapted to manage and/or monitor virtualized resources, such as the virtual machines 164 and/or the hypervisors 163. The administrative function 166 may be included within an operation and maintenance (O&M) function, allowing for operation and maintenance of physical as well as virtualized resources. The administrative function 166 may be implemented as a service and/or as software hosted on a server. The administrative function 166 may operation in cooperation with one or more of the hypervisors 163 to create, commission and/or instantiate new virtual machines 164, to migrate virtual machines 164 from one host 161 to another, and/or to decommission virtual machines 164, as may be necessary to serve demands of one or more client applications.

Example client applications include, without limitation, broadband applications 167 hosted on data terminals 114 and/or access terminals 112. The broadband applications 167 may access server applications hosted on the virtual machines 164 via a broadband access 110 and/or the example communications network 125. Other examples of client applications include, without limitation, media access applications 168 hosted on smart televisions, e.g., display device 144 and/or media terminals 142, and mobile applications 169 hosted on a vehicle 126, a mobile device 124 and/or the base station or access point 122. The media access applications 168 and mobile applications 169 may access server applications hosted on the virtual machines 164 via their respective access networks 140, 120 and/or via the example communications network 125.

In at least some embodiments, the private UUIDs 165 are generated in cooperation with the hypervisor 163. For example, the hypervisor 163 may generate a private UUID 165 upon creation, commissioning and/or instantiation of a new virtual machine 164. According to the techniques disclosed herein, the hypervisor 163 may identify a host 161, obtain a UUID 162 of the host 161, e.g., probing the host 161 hardware via SMBIOS, to obtain a UUID 162 provided by a manufacturer of the host 161. The hypervisor 163 may generate a virtual machine identifier, e.g., using a random process, such as a random function. The hypervisor 163 may combine at least a portion of the UUID 162, e.g., the host ID portion, with the virtual machine identifier, e.g., a random number, to obtain the private UUID 165. In at least some embodiments, the UUID 162 and the private UUID 165 are compliant with the same standards.

The private UUIDs 165, having been configured with the host ID portion of the UUID 162 may be examined, e.g., by the hypervisor 163 and/or by the administrative function 166, thus revealing a host 161 upon which the virtual machine 164 was created. Accordingly, virtual resources may be managed by their private UUIDs, while also providing insight into which physical resources they are allocated. For example, a hypervisor 163 and/or an administrative function 166 may be configured to monitor one or more performance indicators, e.g., processing speed, memory access, communication performance and so on. The hypervisor 163 and/or the administrative function 166 may be adapted to manage virtualized resources based on the monitored performance indicators. An administrative function 166 may determine that a new virtual machine should be instantiated to satisfy demands of the client applications 167, 168, 169. Alternatively or in addition, the administrative function 166 may determine that an existing virtual machine 164 of one host 161 should be migrated to another host 161 to improve performance.

Figure 2A:
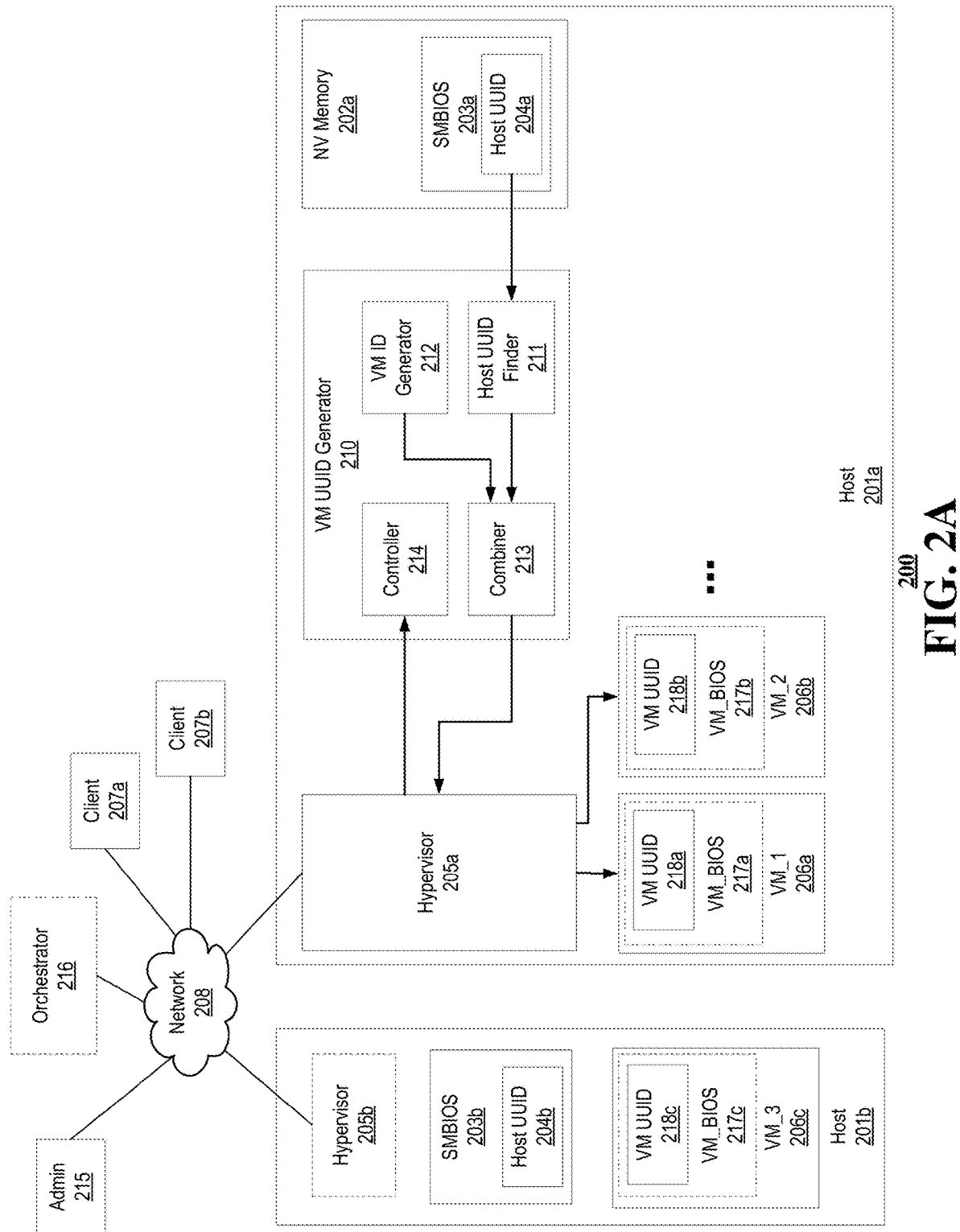
FIG. 2A is a block diagram illustrating an example, non-limiting embodiment of a system that supports virtualization functioning within the communication network of FIG. 1 in accordance with various aspects described herein.

FIG. 2A is a block diagram illustrating an example, non-limiting embodiment of a system 200 that supports virtualization functioning within the communication network of FIG. 1 in accordance with various aspects described herein. The example system includes first and second host processing systems 201a, 201b, generally hosts 201. Each host 201 includes a respective non-volatile memory 202a, 202b, generally 202. Each non-volatile memory 202 includes a respective Basic Input/Output System (BIOS), e.g., system management BIOS (SMBIOS) 203a, 203b, generally 203. Each SMBIOS 203 may store a respective host identifier, e.g., a host UUID 204a, 204b, generally 204.

Each host 201 also includes a respective virtualization controller, sometimes referred to as a hypervisor 205a, 205b, generally 205. The hypervisors 205 are adapted to manage one or more virtual machines (VM) 206a, 206b, 206c, generally 206. Management of the VMs 206 may include one or more of initializing, commissioning, decommissioning, cloning, and/or transferring one or more VMs within the same host 201 and/or among more than one different hosts 201. In order to facilitate management of the VMs 206, each VM 206 is confirmed with a respective VM UUID value 218a, 281b, 281c, generally 218, sometimes referred to as a private UUID value 218. According to the illustrative example, each of the VMs 206 may be configured with a respective VM BIOS 217a, 217b, 217c, generally 217. Each respective VM BIOS, in turn, may be adapted to store the respective private UUID value 218.

Hosts 201 may include, without limitation, rack-mounted servers, e.g., datacenter servers, desktop servers, laptop computers, tablet devices, mobile communication devices, network elements, and the like. It is envisioned that one or more of the hosts 201 may be in communication with one or more communication networks 208. The communication network(s) 208, without limitation, may include one or more of a wide area network, e.g., the Internet, a location area network (LAN), e.g., an Ethernet and/or AppleTalk network, a personal area network, e.g., BlueTooth. Connections between the host 201 and the network 208 may be wired, e.g., using a standard network cable, such as a coaxial cable, optical fiber cable, and twisted pair cables. Alternatively or in addition, connections between the host 201 and the network 208 may include wireless communication links, e.g., according to one or more of a WiFi protocol link, a BlueTooth protocol link, a mobile cellular link, a nearfield communications link, and the like.

In at least some embodiments, the host 201 may be in communication with one or more client devices 207a, 207b, generally 207. For example, the client devices 207 may include any combination of desktop workstations, laptop computers, tablet devices, smart phones, and the like. It is understood that in at least some applications, one or more of the client devices 207 may include a machine, such that communications between the host 201 and the client device 207 comply with machine-type communications, e.g., according to an Internet of things (IoT) applications. Machine-type client devices 207 may include, without limitation, home appliances, e.g., home security systems, home entertainment systems, smart devices, such as printers, kitchen appliances, heating-ventilation and air conditioning (HVAC) systems, lighting systems, monitoring systems, e.g., video monitors, door/entry controls, and the like. In at least some embodiments, machine-type client devices 207 may include vehicles, e.g., smart cars, drones, and so on.

It is envisioned that in at least some applications, the system 200 may include an administrative function 215. The administrative function 215 may be adapted to facilitate access to and/or operations of one or more of the hosts 201, the hypervisors 205, and/or the VMs 206. In at least some embodiments, the administrative function 215 may include an operation and maintenance (O&M) function, e.g., accessible via an O&M terminal and/or application.

In at least some applications, the VMs 206 may be deployed in and/or otherwise utilized within a software defined network (SDN). SDN applications may include an orchestration function 216. The orchestration function 216 may be adapted to facilitate access to and/or operations of one or more of the hosts 201, the hypervisors 205, and/or the VMs 206. In at least some embodiments, the orchestration function 216 may be configured to run autonomously. Alternatively or in addition, the orchestration function 216 may be accessible via an SDN O&M terminal and/or application.

A descriptive file and/or template, such as an extensible markup language (XML) file/template may be used to organize information related to and/or a definition a VM. Such information may include a host name of the VM, and/or other requirements, such as a processing, i.e., CPU, requirement, a memory requirement, a required number and/or type of communication, i.e., network, interfaces and so on. An XML template may also include one or more UUID fields. For example, if the UUID field is left empty, then a system, such as a hypervisor, may automatically generate a UUID, e.g., randomly. In at least some embodiments, rather than following a script of an XML file to generate UUID randomly, the UUID generation may be configured to restrict generated UUIDs to a subset of UUIDs of a host and/or parent hypervisor. For example, the script may obtain a UUID of the physical host as may be obtained from nonvolatile memory (SMBIOS) attached to the host/parent system. For example, a host UUID may be arranged according to five fields, of which the fifth field is a randomly generated field. In generating a modified UUID of the VM, a subset of the host UUID, e.g., four of the five fields, may be taken from host UUID. A randomly generated field may then be added to the extracted four fields to yield a modified UUID having five fields that uniquely identifies the VM, as well as the VM's association to its host or parent.

Such a UUID generation and/or modification procedure may be employed at a time of creation of a VM, e.g., responsive to a VM creation command and/or event. Alternatively or in addition, the same or similar process may be applied when an existing VM is migrated to another host. For example, upon a detection of a command to migrate and/or a migration event, the same or similar process may be repeated. Namely, the UUID of the target host/parent may be obtained, e.g., via SMBIOS of the target host/parent. A subset of fields of the target UUID may be extracted, e.g., the first four fields, and combined with the previously generated fifth field to obtain a newly modified UUID for the migrated VM. In this manner, the fifth field may be used to identify a particular VM, while the first four fields may be used to identify a current host/parent.

It is further envisioned that the UUID generation and/or modification process may be adapted to incorporate other information into a modified UUID. For example, one or more fields may be used to identify whether a VM has been migrated, e.g., a migration flag. Alternatively or in addition, the number of fields may be adjusted to permit retaining a record of one or more legacy host/parent processors. In at least some embodiments, a modified UUID of a VM includes a host/parent ID as well as a former parent ID, in addition to the randomly generated VM portion.

In some embodiments, e.g., in a software defined network, an orchestration tool may be configured with an option to track migration of VMs. In some embodiments, a history of MV migrations and/or transitions may be generated. For example, when a VM UUID generation process is performed, the resulting modified UUID may be entered into a record. The record entry may include a temporal reference, such as a sequence number, time and/or date, and so on. As the VM UUID generation process may be repeated, e.g., during a migration and/or transition of an existing VM to another host/parent, the resulting modified UUID of the VM may be entered as a modified record and/or as a new record. Such records may be used to identify a VM's current location as well as a historical records of any migrations/transfers along with their corresponding dates and times. Such records may be generated and/or updated without having to separately reference a VM to host mapping and/or without having to separately probe the host processing system hardware.

The possibility of using modified UUIDs to track historical migration, and/or time of migration, may be used by other system management and/or virtualization tools, e.g., to facility recovery of a previous host. It is envisioned that a hypervisor may retain information, record of movement, e.g., including instructions and/or logic to note and/or use migration information that may facilitate future hypervisor operation, e.g., decisions. For example, a hypervisor may be adapted to retain a record that VM_9 and VM_10, which previously existed on Host_1, have since been migrated to Host_2. Such records may include a time stamp that may be used to identify when VM_9 and VM_10 started on Host_2. The hypervisor may not know where VM_9 and VM_10 came from, but it knows that VMs were moved, where they were moved to and at what time the move occurred.

Figure 2B:
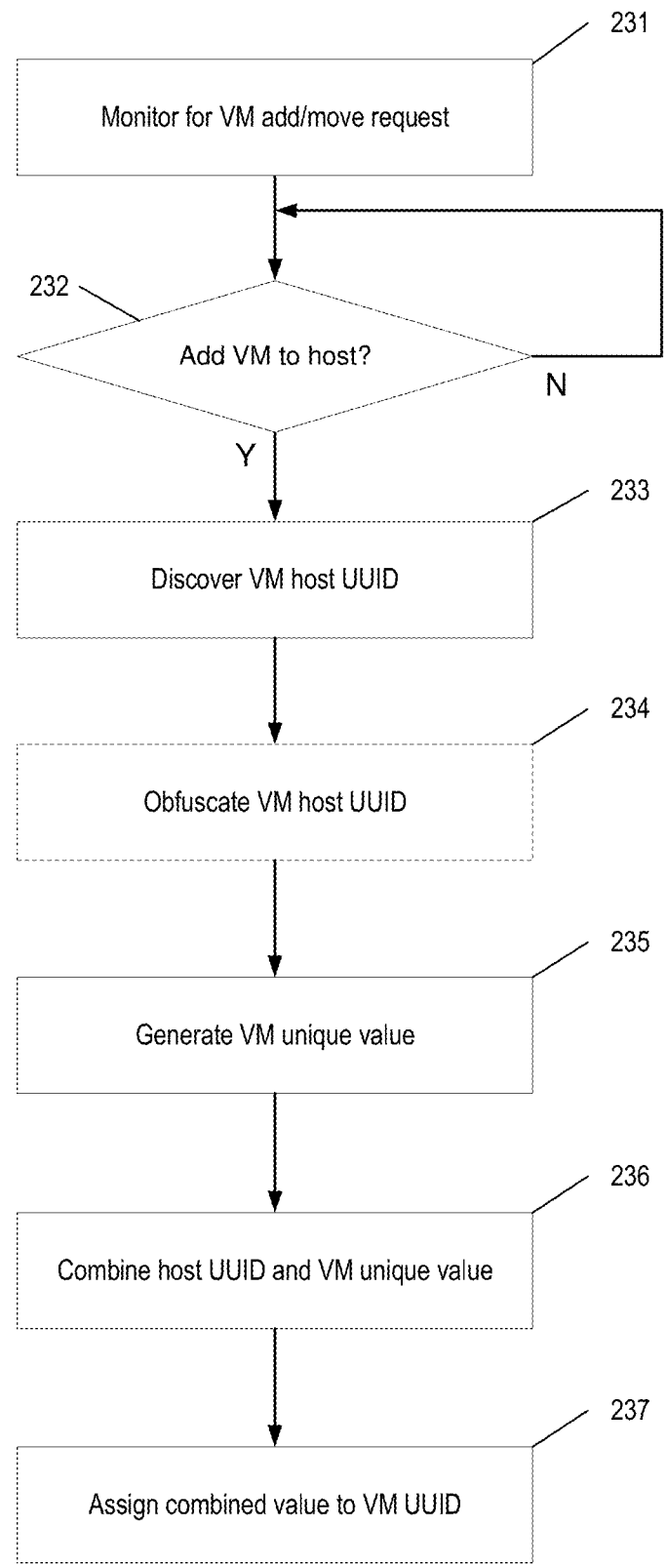
FIG. 2B depicts an illustrative embodiment of a process in accordance with various aspects described herein.

FIG. 2B depicts an illustrative embodiment of a process 230 in accordance with various aspects described herein. The process 230 includes monitoring at 231 for operation and/or maintenance (O&M) activity related to virtual machine life-cycle events. Life-cycle events may include, without limitation, creation of a new virtual machine, transfer of an existing virtual machine from one physical host to another, cloning of an existing virtual machine, and/or termination of an existing virtual machine. At least some of the life-cycle events, e.g., virtual machine creation, may involve instantiation of a guest virtual machine upon a particular host processor.

A determination may be made at 232 as to whether a monitored O&M activity relates to a life-cycle event adapted to create a new instance of a virtual machine upon a target host processor. To the extent the monitored O&M activity does not relate to creation of a new instance, the process 230 may continue to monitor O&M activity at 213. However, to the extent that a determination is made at 232 that a monitored O&M activity relates to a life-cycle event adapted to create a new instance of the virtual machine upon the host processor, the process 230 may proceed to discover at 233, a unique identifier of the host processor. In at least some embodiments, the unique identifier is determined according to a hardware element of the host processor, e.g., a motherboard and/or CPU, and the like. A UUID may be assigned at a time of manufacture of a host processor, a motherboard and/or a CPU and remain fixed through a lifetime of the device. In at least some instances, the UUID is stored in a persistent memory of the host processor, e.g., in a non-volatile memory, such as a BIOS and/or SMBIOS.

In at least some embodiments, the process 230 obfuscates the host UUID at 234 (shown in phantom). Obfuscation may be applied to guard against unnecessary and/or unintentional disclosure of the host UUID within a virtualized environment. Obfuscation may be applied using a hash function, in which a key value may be used to generate a hashed value. Alternatively or in addition, the host UUID may be obfuscated using any form of reversible scrambling and/or encryption. A key value, e.g., an encryption key, may be generated and/or shared with others to facilitate an interpretation of an encrypted host UUID. For example, the key may be shared using public key encryption in a manner that allows a recipient to decrypt an encrypted UUID to obtain the host UUID value. It is envisioned that the hashing and/or encryption function may be adapted to obfuscate and/or encrypt the same host UUID, e.g., using a different key, to obtain different encrypted values for the same host UUID, e.g., different virtual machines running on a common host processor may utilized different encrypted values of the same host UUID.

According to the process 230, a unique value is generated at 235 for the virtual machine to be added to the host processor. The unique value may include a value determined according to a function, e.g., an incremental value determined by a counter and/or some other value, such as a time of request and/or creation, a location of the host processor, a location of a requesting entity, e.g., a subscriber or user, and/or any other entity that may be associated with the creation of the virtual machine, e.g., a network service provider, a back-end service provider, a subscriber, and the like. Alternatively or in addition, the unique value may include a random element, such as a value determined according to a random process. By way of example, the unique value may be generated dynamically by employing a random function or utility, e.g., using a random utility of a toolkit, such as the "OpenSSL" toolkit.

Further according to the process 230, at least a portion of the host UUID may be combined with the unique value at 236 to obtain a modified UUID value, sometimes referred to as a private UUID, e.g., for a particular virtual machine. For example, a private UUID for a virtual machine may be based on a hypervisor UUID. The private UUID string may be based on at least two parts—a static part and a dynamically generated part. The static part may consist of a value inherited from a parent host processor, e.g., e.g., 20 bits inherited from a UUID of a hypervisor host. The dynamically generated part may include a value that is dynamically generated, e.g., 12 bits corresponding to the 5th group and/or segment of an RFC 1422 compliant UUID. Generation of the private UUID in this manner avoids breaking the RFC 4122-compliant UUID format, while permitting generation of a private UUID for the virtual machine.

The private UUID, e.g., a string, may be assigned at 237 to the guest virtual machine. For example, the private UUID may be stored in a bios section of an instantiated virtual machine. In at least some embodiments, the private UUID may be assigned before activation and/or utilization of the virtual machine. For example, the private UUID may be assigned at a time of creation of the virtual machine. A hypervisor that participates in creation of the virtual machine may identify a particular host, and a UUID of the host. The virtual machine may be assigned a private UUID that includes an identifier of the host processor. Thus, an identity of the host processor may be obtained from within the virtual machine environment, e.g., by querying and/or inspecting the virtual machine's UUID. Accordingly, there is no need to reference, access, and/or otherwise maintain a mapping record of an assignment of the virtual machine to the particular target host processor.

Figure 2C:
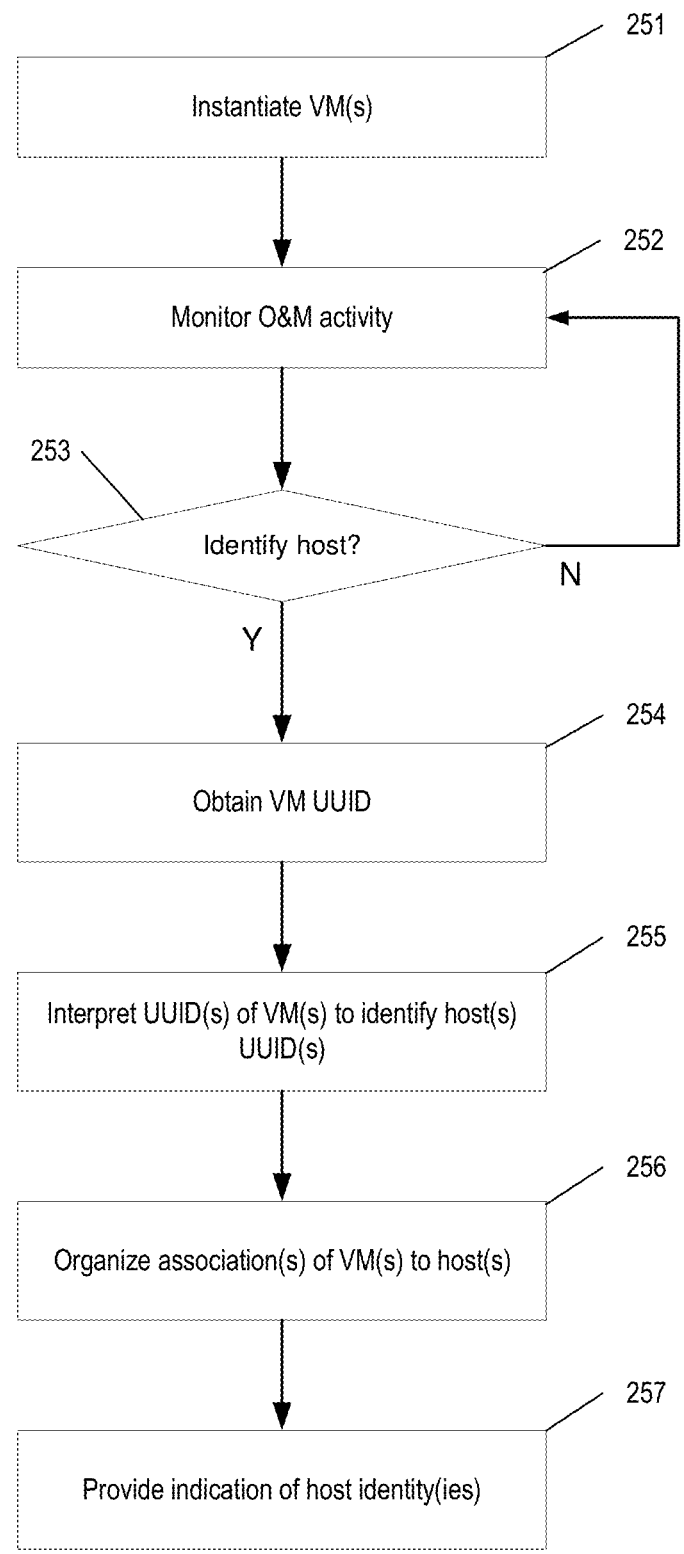
FIG. 2C depicts an illustrative embodiment of a process in accordance with various aspects described herein.

FIG. 2C depicts an illustrative embodiment of a process 250 in accordance with various aspects described herein. The process 250 includes initiating at 231 one or more virtual machines. Instantiation may include any combination of creation of a new virtual machines on target host processors, migration of existing virtual machines from a legacy target host processor to a new target host processor, cloning of an existing virtual machine on one target host processor to one or more new virtual machines on the same and/or different target host processors, and the like.

The process 250 includes monitoring at 252 for O&M activity related to virtual machines. O&M activity may include a number of commands, requests and/or messages that may relate to one or more guest virtual machines, processes running on guest virtual machines, host processors hosting guest virtual machines, and so on. For example, monitored O&M activity may relate to a request for memory and/or processor utilization of one or more gest virtual machines. Alternatively or in addition, the monitored O&M activity may relate to a request for running processes, e.g., to determine load balancing, and the like.

A determination may be made at 253 as to whether a monitored O&M activity relates to any request that may require an identity of the guest virtual machine UUID(s) and/or the host processor(s). To the extent the monitored O&M activity does not relate to a request that may require an identity of the guest virtual machine UUID(s) and/or the host processor(s), the process 250 may continue to monitor O&M activity at 252. However, to the extent that a determination is made at 253 that a monitored O&M activity relates to a request that may require an identity of the guest virtual machine UUID(s) and/or the host processor(s), the process 250 may proceed to obtain at 254, the private UUID assigned to the guest virtual machines, e.g., as may have been accomplished using the example process 230 (FIG. 2B). For example, the guest virtual machine UUID may be obtained by implementing a command at the guest virtual machine to identify its UUID, previously stored in its BIOS portion of the virtual machine.

According to the process 250, the UUIDs of any guest virtual machines may be examined, parsed and/or otherwise interpreted at 255 to obtain one or more UUIDs of the host processor(s) upon which the virtual machines have been instantiated. For example, the private UUID of a particular virtual machine may have been obtained by combination of a host UUID another value unique to the virtual machine. For example, the private UUID for the virtual machine may have been based on a UUID of the corresponding hypervisor. By way of example, the private UUID string may be based on at least two parts—a static part and a dynamically generated part. The static part may consist of a value inherited from a parent host processor, e.g., e.g., 20 bits inherited from a UUID of a hypervisor host. The dynamically generated part may include a value that is dynamically generated, e.g., 12 bits corresponding to the 5th group and/or segment of an RFC 1422 compliant UUID. Accordingly, the UUID of the host processor may be obtained according to the 20 bits inherited from the UUID of the hypervisor host.

In at least some embodiments, the results obtained by interpreting the UUIDs of the virtual machines may be organized at 256. For example, the identified host processors may be organized in association with their guest virtual machines, e.g., in a tabular form, such as in a spreadsheet and/or database record. Further according to the example process 250, indications of the identified host entities may be provided at 257 to a requesting entity, such as a request generated and/or otherwise initiated with the assistance of an O&M system.

In at least some embodiments, at least some portions of the example process 250 may be repeated periodically, e.g., according to a predetermined schedule. Consider an O&M process that periodically requests one or more of identities and/or status of guest virtual machines and/or host processors. Such requests may be made according to a regular schedule, e.g., daily, hourly, according to predetermined busy hours, and so on. The process 250 may be run according to the schedule to obtain an updated record of results. The results may be stored according to their implementation sequence and/or time to obtain a corresponding historical record.

Alternatively or in addition, at least some portions of the example process 250 may be performed and/or repeated, e.g., according to an event. Events, without limitation, may be based on a monitoring of one or more of parameters, e.g., system parameters, such as memory utilization, CPU utilization, communication activity, disk access and the like. Consider an O&M process that requests one or more of identities and/or status of guest virtual machines and/or host processors responsive to a monitored system parameter, such as a memory and/or CPU utilization crossing a predetermined threshold. For example, when CPU utilization exceeds a high threshold value, e.g., 90% utilization, the O&M may request a status of the virtual machine activity and correlate such activity with the corresponding host processors. The results may be used to instantiate new virtual machines, e.g., by cloning existing virtual machines on the same and/or different host processors. Alternatively or in addition, the results may be used to redistribute virtual machines among available host processors, e.g., to manage utilization within a performance goal.

While for purposes of simplicity of explanation, the respective processes are shown and described as a series of blocks in FIGS. 2B and 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

The disclosed techniques facilitate organization of virtual machines at creation time based on a UUID of a parent, e.g., a UUID of a physical hypervisor host, instead of organizing the virtual machine after creation. The UUID is a 16-octet (128-bit) number and is used to identify objects in computer systems, such as physical hosts, virtual machines, network interface cards, disk drives, virtual functions, and the like. Regarding the physical host, the UUID may be hardcoded in the smbios.uuid environment and can be retrieved from a Linux® utilities such as "dmidecode" or from the system BIOS. One of the main reasons for using UUIDs is that no centralized authority is required to administer them. As a result, generation on demand may be completely automated, and used for a variety of purposes. RFC-4122 deals with the details of UUID standards, which most compute hosts of various manufacturers adhere to.

The UUID may be displayed in five groups, or segments, separated by hyphens, e.g., in the form 8-4-4-4-12, for a total of 36 characters (32 alphanumeric characters and 4 hyphens). The UUIDs may be separated by time, version, clock_seq_hi, clock_seq_lo and node as defined in the RFC adoption IETF RFC4122. However, the RFC 4122 UUID string also specifies fixed values of six bits on first four bits of the third group(segment) and first two bits of the fourth group(segment). The use of UUIDs is widespread, with many computing platforms providing support for generating them and for parsing their textual representation.

Heretofore, the UUID would be generated randomly and assigned to the virtual machine. The UUID is critical to bring up the virtual machine and to permit its usage by various system utilities, such as the file system mount system, some licensing daemons, and the like. According to the techniques disclosed herein, a private UUID for a virtual machine is generated based on a hypervisor UUID and assigned to the guest virtual machine at a time of virtual machine creation. The private UUID string may be based on at least two parts—a static part, e.g., consisting of 20 bits inherited from the parent (Hypervisor Host), and a dynamically generated part, e.g., 12 bits of a fifth group/segment of the private UUID that may be dynamically generated, e.g., employing the openssl random utility. Such an approach avoids breaking the RFC 4122-compliant UUID format, while allowing generation of a definable private string. In most KVM environments in which virtual machines run, a binding between physical servers and their virtual machines are generally static (meaning, the virtual machine remains on the physical host where it was built), and rarely do the virtual machines float across physical hosts, unless it is part of a high-available KVM cluster setup.

Provided below in Table 1 is an example of a UUID generated by a physical host and stored in smbios/uuid.

TABLE 1

Example UUID.

smbios/uuid:uuid - 4c4c4544-004c-3210-8047-b6c04f534432

The same UUID may be observable by an operating system running on a host (hypervisor), as illustrated below in Table 2.

TABLE 2

Observation of Host UUID.

root@pocnjrsv150:/# dmidecode -s system-uuid
4C4C4544-004C-3210-8047-B6C04F534432

An example of VM UUIDs generated in this manner are illustrated below in Table 3. Generated VM UUIDs for four virtual machines are shown. Each generated VM UUID includes a first fixed portion, i.e., "4C4C45440994C-3210-8047" obtained from the host, and a second VM specific portion obtained from the random process.

TABLE 3

Example Generated VM UUIDs.

sh3237@mtznjgps01$ echo "4C4C4544-004C-3210-8047-$(openssl rand -hex 6)"
4C4C45440994C-3210-8047-cc8d03b2d3fa
sh3237@mtznjgps01$ echo "4C4C4544-004C-3210-8047-$(openssl rand -hex 6)"
4C4C45440994C-3210-8047-a0f452741541
sh3237@mtznjgps01$ echo "4C4C4544-004C-3210-8047-$(openssl rand -hex 6)"
4C4C45440994C-3210-8047-70b4c478da42
sh3237@mtznjgps01$ echo "4C4C4544-004C-3210-8047-$(openssl rand -hex 6)"
4C4C45440994C-3210-8047-71126be63c8d It is envisioned that the VM specific portion may be of any suitable length and/or format. According to the illustrative example, any possibility of a collision, e.g., a conflict with an existing VM UUID generated for another VM on the same host, by this randomly generated VM UUID for virtual machines is negligible, i.e., 1 in 16 $\wedge$12.

The above generated VM UUIDs may be embedded in a script, e.g., an XML file provided below, before spinning up the virtual machines. The UUIDs may be retrieved from the virtual machine via dmidecode or from the XML file used at the time of VM creation. An example retrieval of a VM UUID is illustrated below in Table 4.

TABLE 4

Retrieval of VM UUID

<domain type= 'kvm' id='1'>
<uuid>4C4C45440994C-3210-8047- cc8d03b2d3fa</uuid>

The techniques disclosed herein offer a tremendous help in automation of data center management tasks as thousands of guest virtual machines may be simply mapped to their corresponding physical hosts in a few seconds, e.g., by a maintaining a simple look up table at the time of creation of virtual machines. Consequently, the techniques disclosed herein may facilitate capacity planning for compute environments, troubleshooting issues, etc., as finding a parent hypervisor for a given guest virtual machine is just a simple lookup based on a simple UUID string of the guest virtual machine.

An objective of the disclosed techniques is to make it easy to derive information as to which host the virtual machine resides on with minimal effort. By simply looking up a UUID of a virtual machine, a physical host will be identified. It is advantageous during troubleshooting, e.g., troubleshooting of KVM based environments, in which virtual machines do not migrate across physical server (such as in non-high availability clusters). If a virtual machine is not responding or has been inadvertently deleted, one could quickly identify the physical host to permit examination of its log files. Alternatively or in addition, the information may be used to identify any bottlenecks a host may be experiencing. The virtual machine to host mapping information would also be helpful to identify virtual machines that may be impacted by scheduled maintenance, thereby facilitating an informing of a user community during times of scheduled maintenance of hosts as to which virtual machines will be impacted. Even in the case of a setup involving high availability setup, where the virtual machines may migrate across hosts, the virtual machine mapping information may be useful to offer visibility into a migration path of the virtual machines across the physical servers, e.g., by mapping virtual machines to physical hosts through a simple script. Such techniques would assist in gaining an understanding of a behavior of an application running on a virtual machine and its load on a corresponding physical host, to assist an infrastructure team in its capacity planning. Additionally, if a system boards needs to be replaced on a physical host, that would cause the smbios/uuid to change on the hypervisor host (and there by affect the mapping), the modified UUID generation process may be reapplied to update the modified UUIDs of the virtual machines to reflect a new host UUID value. Still other utilities, e.g., those provided by vendor, may assist in restoring original UUIDs to BIOS.

Figure 3:
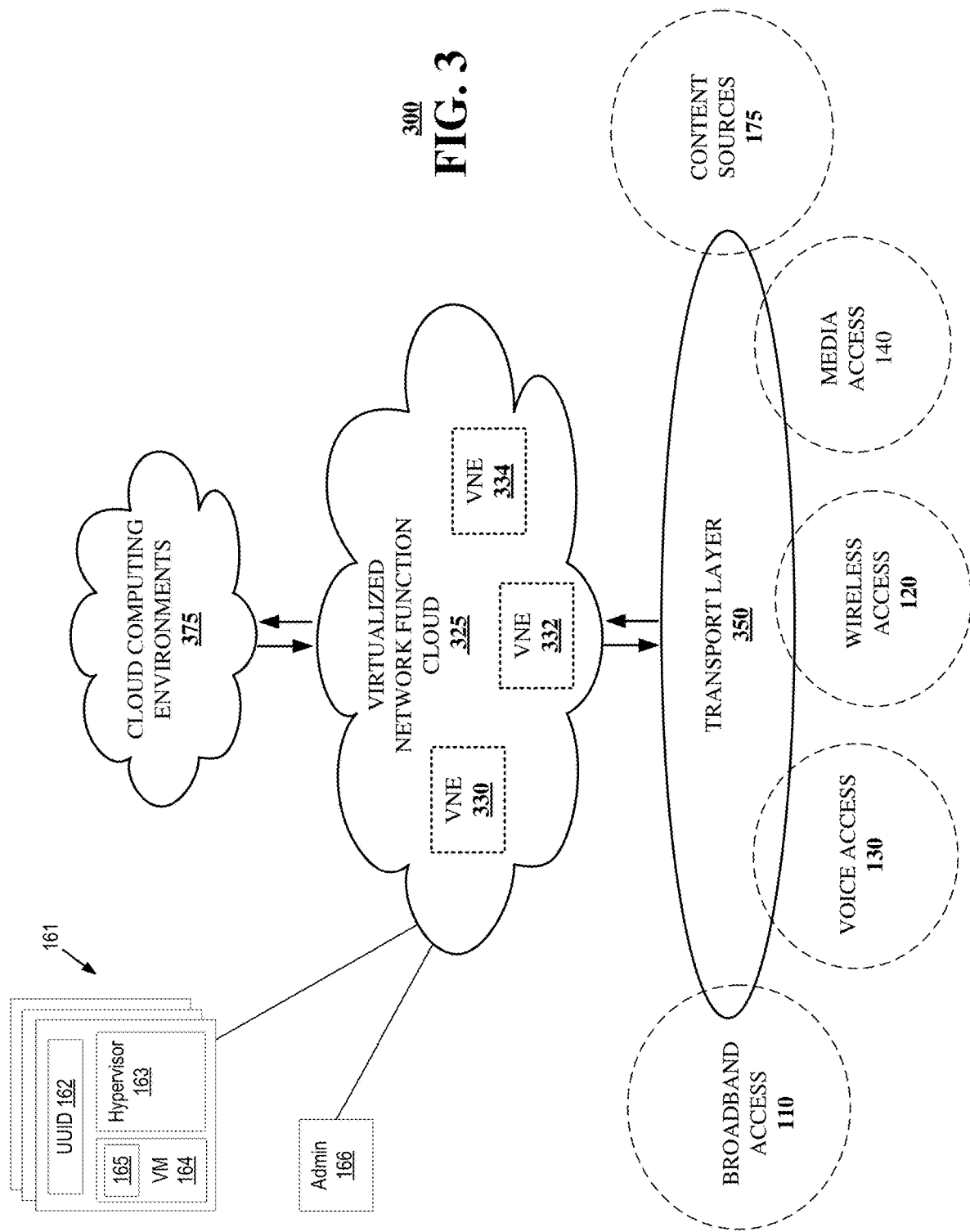
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. Software-defined networking may be used in conjunction with VM migration software and a central orchestration layer. In particular a virtualized communication network is presented that can be used to implement some or all of the subsystems and functions of system 100, the subsystems and functions of system 200, and processes 230, 250 presented in FIGS. 1, 2A, 2B, 2C, and 3. For example, virtualized communication network 300 can facilitate in whole or in part the identifying of a request to install a guest virtual machine on a physical host, the identifying of a UUID of the physical host, the identifying of a virtual machine reference value, and the defining of a modified UUID of the guest virtual machine. The modified UUID includes the UUID of the physical host and the virtual machine reference value and may be assigned to the guest virtual machine, allowing for identification of the physical host via the modified UUID of the guest virtual machine.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

The example virtualized communication network 300 may include one or more hosts 161 and at least one administrative function 166. The hosts 161 include UUIDs 162, e.g., stored within their respective nonvolatile memories. At least some of the hosts 161 may be configured with a hypervisor 163 adapted to monitor and/or manage virtualized resources, such as virtualized resources of a particular host 161. The virtual resources may include one or more virtual machines 164 that, in turn, are configured with respective private UUIDs 162. The private UUIDs 162 may be generated according to a private UUID generation function that probes hardware of the associated host 161, e.g., at a time of creation of the virtual machine 164. The hardware probing may obtain the host UUID 162, which may be a fixed or unchangeable value prescribed at a time of manufacture of the hardware, e.g., the motherboard, and/or the CPU. The private UUID generation function may parse the UUID 162 to identify at least a portion of the UUID 162 that sufficiently identifies the host 161. The private UUID generation function may combine the extracted UUID portion with a locally generated value to obtain a private UUID 165 that is sufficiently unique to the virtual machine 164, while also identifying the host 161 upon which the virtual machine 164 is hosted.

Figure 4:
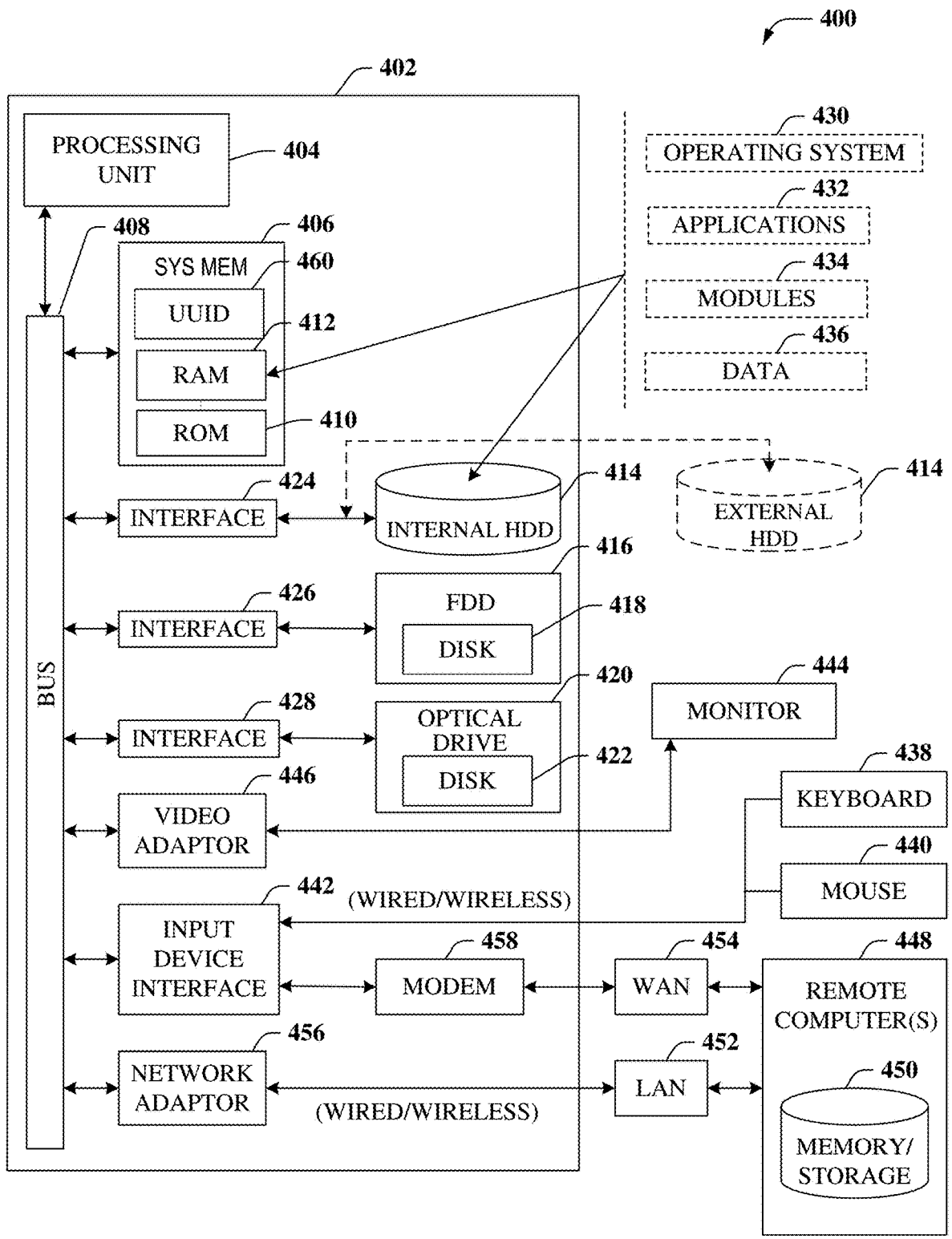
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part the identifying of a request to install a guest virtual machine on a physical host, the identifying of a UUID of the physical host, the identifying of a virtual machine reference value, and the defining of a modified UUID of the guest virtual machine. The modified UUID includes the UUID of the physical host and the virtual machine reference value and may be assigned to the guest virtual machine, allowing for identification of the physical host via the modified UUID of the guest virtual machine.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system memory 406 may include a UUID 460 of the computer 402, e.g., determined and assigned to the computer 402 at a time of manufacture. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
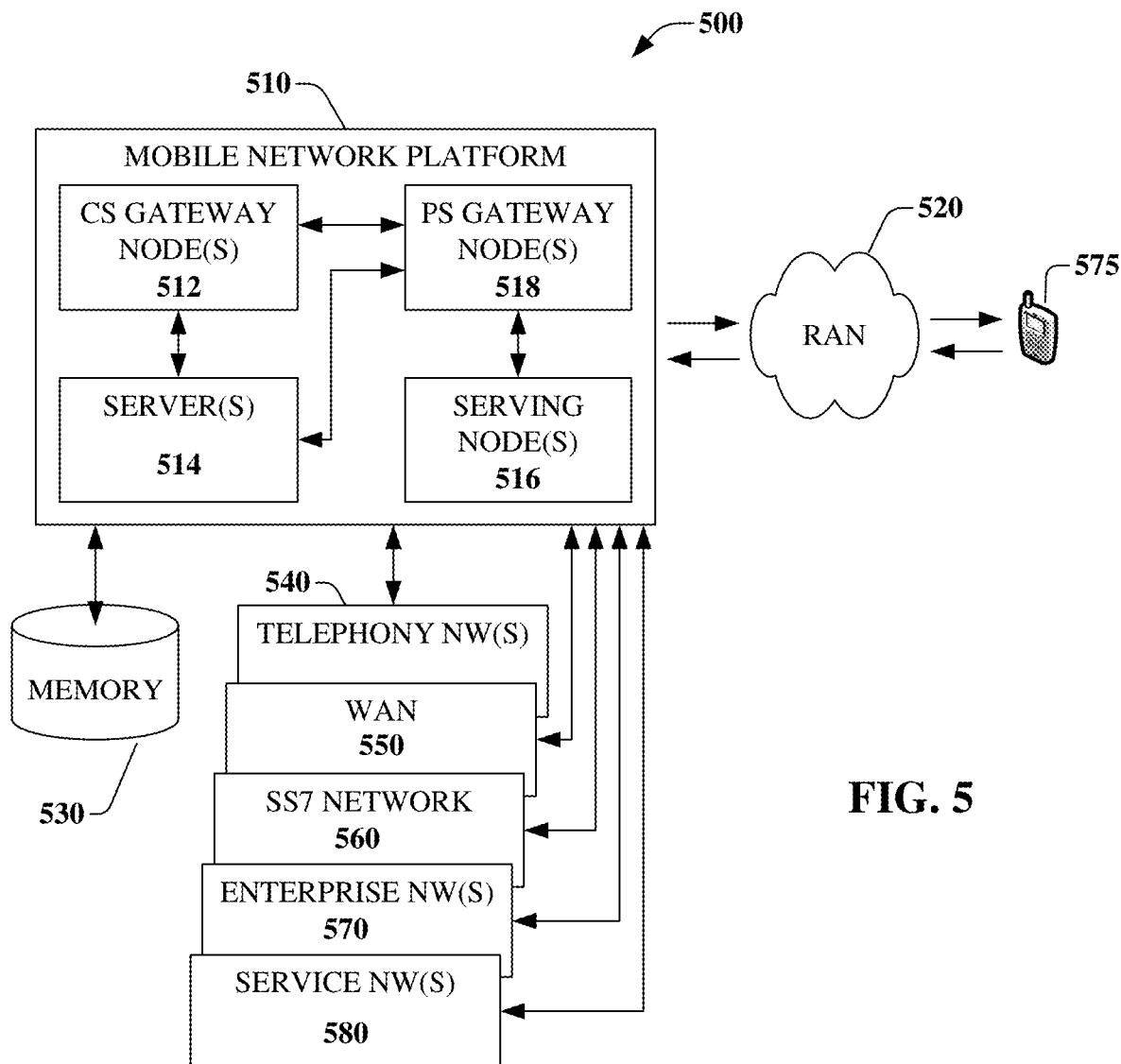
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part the identifying of a request to install a guest virtual machine on a physical host, the identifying of a UUID of the physical host, the identifying of a virtual machine reference value, and the defining of a modified UUID of the guest virtual machine. The modified UUID includes the UUID of the physical host and the virtual machine reference value and may be assigned to the guest virtual machine, allowing for identification of the physical host via the modified UUID of the guest virtual machine. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
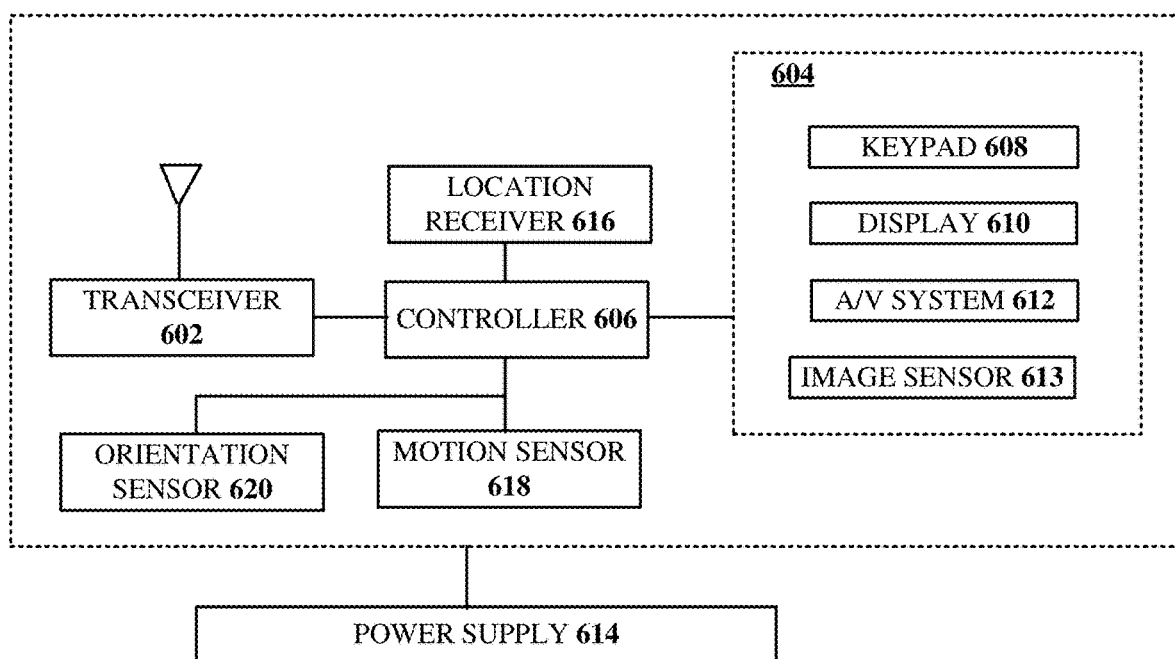
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, base station or access point 144 or other client devices for communication via either communications network 125. For example, computing device 600 can facilitate in whole or in part the identifying of a request to install a guest virtual machine on a physical host, the identifying of a UUID of the physical host, the identifying of a virtual machine reference value, and the defining of a modified UUID of the guest virtual machine. The modified UUID includes the UUID of the physical host and the virtual machine reference value and may be assigned to the guest virtual machine, allowing for identification of the physical host via the modified UUID of the guest virtual machine.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
   detecting, by a processing system including a processor, a request to add a virtual machine to a first physical host processing system;
   discovering, by the processing system, a first prescribed universally unique identifier (UUID) of the first physical host processing system;
   generating, by the processing system, a virtual machine reference value;
   obfuscating, by the processing system, the first prescribed UUID of the first physical host processing system to obtain a first obfuscated UUID;
   generating, by the processing system, a first modified UUID of the virtual machine comprising the first prescribed UUID of the first physical host processing system and the virtual machine reference value; and
   assigning, by the processing system, the first modified UUID to the virtual machine, the first physical host processing system being identifiable via the first modified UUID of the virtual machine, wherein the generating of the first modified UUID of the virtual machine comprises combining the first obfuscated UUID of the first physical host processing system and the virtual machine reference value, the first physical host processing system identifiable via de-obfuscation of the first obfuscated UUID of the first modified UUID of the virtual machine.

2. The method of claim 1, wherein the first prescribed UUID comprises an unchangeable value associated with a hardware component of the first physical host processing system.

3. The method of claim 2, wherein the discovering the first prescribed UUID of the first physical host processing system comprises examination of a system management BIOS value corresponding to a hardware item of the first physical host processing system.

4. The method of claim 1, wherein the virtual machine reference value comprises a randomly generated value.

5. The method of claim 4, wherein the randomly generated value comprises a hexadecimal value, suitably large to ensure uniqueness within a confidence threshold.

6. The method of claim 1, further comprising:
   detecting, by the processing system, a request to migrate the virtual machine to a second physical host processing system; and
   responsive to the detecting the request to migrate:
      identifying, by the processing system, a second prescribed UUID of the second physical host processing system;
      generating, by the processing system, a second modified UUID of the virtual machine comprising the second prescribed UUID of the second physical host processing system and the virtual machine reference value; and
      assigning, by the processing system, the second UUID to the virtual machine, the second physical host processing system being identifiable via the second UUID.

7. The method of claim 6, wherein the second modified UUID of the virtual machine comprises the first prescribed UUID of the first physical host processing system, the second prescribed UUID of the second physical host processing system and the virtual machine reference value.

8. The method of claim 7, wherein the generating the virtual machine reference value further comprises application of a random process.

9. The method of claim 1, wherein the obfuscating comprises hashing the first prescribed UUID with a key value, de-obfuscation being obtainable via an application of the key value to the first obfuscated UUID.

10. The method of claim 1, wherein the first prescribed UUID of the first physical host processing system and the first modified UUID comprise 128-bit labels, comprising 32 hexadecimal digits arranged in five groups separated by hyphens.

11. The method of claim 10, wherein the first prescribed UUID of the first physical host processing system and the first modified UUID are compliant with RFC-1422 of the Internet Engineering Task Force.

12. The method of claim 1, wherein the generating the first modified UUID of the virtual machine further comprises:
   referencing an extensible markup language (XML) template definition, the first modified UUID being compliant with the XML template definition.

13. The method of claim 1, wherein the first physical host processing system is identifiable via the first modified UUID, without reference to a separate record of a virtual machine-to-physical host processing system pairing.

14. A device, comprising:
   a processing system including a processor; and
   a memory that stores executable instructions that, when executed by the processing system, facilitate performance of operations, the operations comprising:
      determining a request to instantiate a virtual machine on a physical processing system;
      obtaining a prescribed universally unique identifier (UUID) of the physical processing system;

generating a virtual machine reference value;
defining a modified UUID of the virtual machine comprising the prescribed UUID of the physical processing system and the virtual machine reference value;
assigning the modified UUID to the virtual machine, the physical processing system being identifiable via the modified UUID of the virtual machine;
detecting a request to migrate the virtual machine to a second physical host processing system; and
responsive to the detecting the request to migrate:
  identifying a second prescribed UUID of the second physical host processing system;
  generating a second modified UUID of the virtual machine comprising the second prescribed UUID of the second physical host processing system and the virtual machine reference value; and
  assigning the second UUID to the virtual machine, the second physical host processing system being identifiable via the second UUID.

15. The device of claim 14, wherein the generating the virtual machine reference value further comprises application of a random process.

16. The device of claim 14, wherein the obtaining the prescribed UUID comprises examination of a system management BIOS value corresponding to hardware of the physical processing system.

17. The device of claim 14, wherein the prescribed UUID and the modified UUID are compliant with RFC-1422 of the Internet Engineering Task Force.

18. A non-transitory, machine-readable medium, comprising executable instructions that, when executed by a processing system including a processor, facilitate performance of operations, the operations comprising:

identifying a request to install a guest virtual machine on a physical host;
identifying a universally unique identifier (UUID) of the physical host;
generating a virtual machine reference value;
defining a modified UUID of the guest virtual machine comprising the UUID of the physical host and the virtual machine reference value; and
assigning the modified UUID to the guest virtual machine, the physical host being identifiable via the modified UUID of the guest virtual machine;
detecting a request to migrate the virtual machine to a second physical host processing system; and
responsive to the detecting the request to migrate:
  identifying a second prescribed UUID of the second physical host processing system;
  generating a second modified UUID of the virtual machine comprising the second prescribed UUID of the second physical host processing system and the virtual machine reference value; and
  assigning the second UUID to the virtual machine, the second physical host processing system being identifiable via the second UUID.

19. The non-transitory, machine-readable medium of claim 18, wherein the defining the virtual machine reference value further comprises applying a random process to obtain a random value, the virtual machine reference value comprising the random value.

20. The non-transitory, machine-readable medium of claim 18, wherein the UUID and the modified UUID are compliant with RFC-1422 of the Internet Engineering Task Force.

* * * * *